United States Patent
Meade et al.

(10) Patent No.: US 10,670,807 B2
(45) Date of Patent: Jun. 2, 2020

(54) LENS ASSEMBLY FOR OPTICAL FIBER COUPLING TO TARGET AND ASSOCIATED METHODS

(71) Applicant: Ayar Labs, Inc., San Francisco, CA (US)

(72) Inventors: Roy Edward Meade, Oakland, CA (US); John Fini, San Francisco, CA (US); Mark Wade, Berkeley, CA (US)

(73) Assignee: Ayar Labs, Inc., Emeryville, CA (US)

( * ) Notice: Subject to any disclaimer, the term of this patent is extended or adjusted under 35 U.S.C. 154(b) by 0 days.

(21) Appl. No.: 15/841,210

(22) Filed: Dec. 13, 2017

(65) Prior Publication Data

US 2018/0172910 A1      Jun. 21, 2018

Related U.S. Application Data

(60) Provisional application No. 62/434,612, filed on Dec. 15, 2016.

(51) Int. Cl.
*G02B 6/14* (2006.01)
*G02B 6/42* (2006.01)
(Continued)

(52) U.S. Cl.
CPC ............ *G02B 6/14* (2013.01); *G02B 6/0288* (2013.01); *G02B 6/255* (2013.01); *G02B 6/30* (2013.01);
(Continued)

(58) Field of Classification Search
None
See application file for complete search history.

(56) References Cited

U.S. PATENT DOCUMENTS

| 5,165,080 A * | 11/1992 | Healey ................. G02B 6/2817 359/636 |
| 6,956,995 B1 * | 10/2005 | Shafaat .................... G02B 6/32 385/33 |

(Continued)

FOREIGN PATENT DOCUMENTS

| EP | 1281990 A1 * | 2/2003 | ........... G02B 6/2552 |
| GB | 2225124 A * | 5/1990 | ............... G02B 6/32 |

(Continued)

OTHER PUBLICATIONS

Wang et al. ("Further analysis of focusing performance of an ultra-small gradient-index fiber probe", SPIE, Optical Engineering, vol. 53(1), pp. 013106-1 to 013103-9, Jan. 2014) (Year: 2014).*

(Continued)

*Primary Examiner* — Michelle R Connelly
(74) *Attorney, Agent, or Firm* — Penilla IP, APC

(57) ABSTRACT

A lens assembly for an optical fiber includes an optical gap structure and a multi-mode optical fiber. The optical gap structure has first and second ends and a length measured therebetween. The first end of the optical gap structure is configured to attach to an end of a single-mode optical fiber. The multi-mode optical fiber has first and second ends and a length measured therebetween. The first end of the multi-mode optical fiber is attached to the second end of the optical gap structure. The length of the optical gap structure and the length of the multi-mode optical fiber are set to provide a prescribed working distance and a prescribed light beam waist diameter. The prescribed working distance is a distance measured from the second end of the multi-mode optical fiber to a location of the prescribed light beam waist diameter.

40 Claims, 9 Drawing Sheets

(51) Int. Cl.
   *G02B 6/30* (2006.01)
   *G02B 6/255* (2006.01)
   *G02B 6/32* (2006.01)
   *G02B 6/028* (2006.01)

(52) U.S. Cl.
   CPC ............. *G02B 6/32* (2013.01); *G02B 6/4203* (2013.01); *G02B 6/2552* (2013.01); *G02B 6/4214* (2013.01); *G02B 6/4243* (2013.01)

(56) References Cited

U.S. PATENT DOCUMENTS

| | | | | |
|---|---|---|---|---|
| 7,805,034 | B2* | 9/2010 | Kato | A61B 5/0066 385/147 |
| 9,366,695 | B2* | 6/2016 | Erickson | G01Q 20/02 |
| 2003/0165292 | A1* | 9/2003 | Bhagavatula | G02B 6/2552 385/33 |
| 2004/0126059 | A1* | 7/2004 | Bhagavatula | G02B 6/2552 385/33 |
| 2004/0234210 | A1* | 11/2004 | Nagasaka | G02B 6/4214 385/88 |
| 2005/0220401 | A1* | 10/2005 | Jiang | G02B 6/262 385/28 |
| 2006/0228078 | A1* | 10/2006 | Chan | G01M 11/3109 385/92 |
| 2007/0036485 | A1* | 2/2007 | Kato | G02B 6/2937 385/34 |
| 2009/0148099 | A1* | 6/2009 | Sekiya | G02B 6/32 385/33 |
| 2010/0289986 | A1* | 11/2010 | Shikii | G02B 6/0028 349/65 |
| 2011/0058769 | A1* | 3/2011 | Nicholson | H01S 3/0057 385/28 |
| 2012/0014640 | A1* | 1/2012 | Nakashiba | G02B 6/13 385/14 |
| 2012/0020613 | A1* | 1/2012 | Kondou | G02B 6/12004 385/14 |
| 2012/0099112 | A1* | 4/2012 | Alphonse | G01B 9/02044 356/479 |
| 2012/0263416 | A1* | 10/2012 | Morioka | G02B 6/4214 385/33 |
| 2013/0255055 | A1* | 10/2013 | Murgatroyd | G02B 6/25 29/419.1 |
| 2014/0147079 | A1* | 5/2014 | Doerr | G02B 6/262 385/37 |

FOREIGN PATENT DOCUMENTS

| | | | | |
|---|---|---|---|---|
| GB | | 2556052 A | * 5/2018 | ............. G02B 6/327 |
| WO | WO 0111409 | A2 | 2/2001 | |
| WO | WO-0111409 | A3 | * 6/2001 | ........... A61B 5/0066 |

OTHER PUBLICATIONS

PCT International Search Report, PCT/US2017/066523, dated Jul. 25, 2018.

Mekis, Attila, et al., "A Grating-Coupler-Enabled CMOS Photonics Platform," IEEE Journal of Selected Topics in Quantum Electronics 17.3 (2011): 597-608.

Kopp, Christophe, et al., "Silicon Photonic Circuits: On-CMOS Integration, Fiber Optical Coupling, and Packaging," IEEE Journal of Selected Topics in Quantum Electronics 17.3 (2011): 498-509.

OFS Optics, "Solutions for Optical Coherence Tomography (OCT), Optical Fiber and Probes," 2016.

Zickar, Michael, et al., "MEMS Compatible Micro-GRIN Lenses for Fiber to Chip Coupling of Light," Optics Express 14.10 (2006): 4237-4249.

OFS Optics, "Item # BF04431-01, 62.5/125 Acrylate Silica Fibers," 2016.

Prysmian Group, "RadHard 50 micrometer Step-Index Multimode Fibre," 2013.

OFS Optics, "Item # F15330, 125 mirometer Coreless/Acrylate Termination Optical Fiber," 2016.

Corning, "PANDA Polarization Maintaining (PM) Fibers," 2016.

Corning, "SMF-28 Ultra and SMF-28 Ultra 200 Optical Fibers," 2016.

* cited by examiner

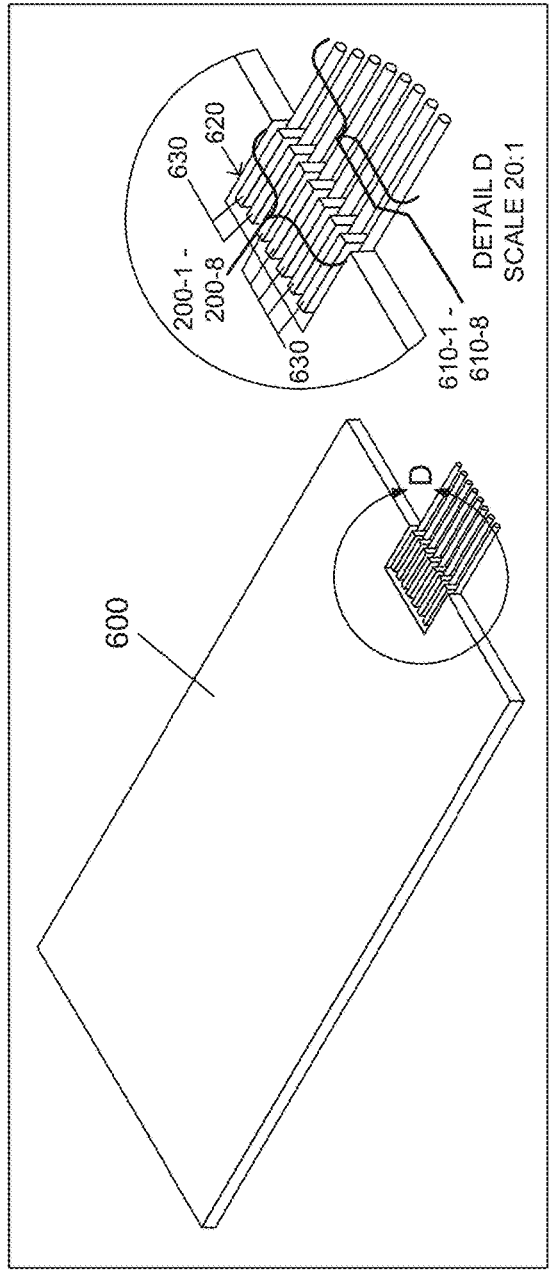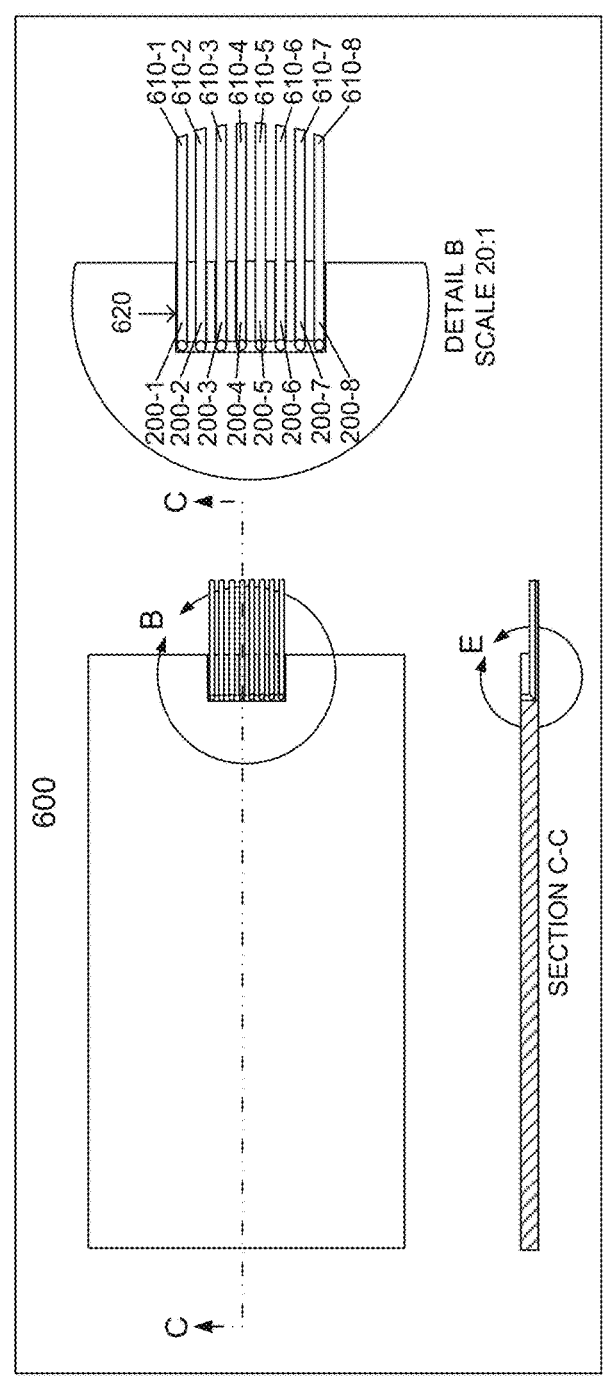

1101

Connect a plurality of lens assemblies to a chip, where:

- each lens assembly includes a respective optical gap structure and a respective multi-mode optical fiber,

- each optical gap structure has a first end and a second end and a length measured between the first and second ends of the optical gap structure,

- the first end of a given optical gap structure is attached to an end of a corresponding single-mode optical fiber,

- each multi-mode optical fiber has a first end and a second end and a length measured between the first and second ends of the multi-mode optical fiber,

- the first end of a given multi-mode optical fiber is attached to the second end of a corresponding optical gap structure,

- within a given lens assembly the length of the optical gap structure and the length of the multi-mode optical fiber are set to provide a prescribed working distance and a prescribed light beam waist diameter, where the prescribed working distance is a distance measured from the second end of the multi-mode optical fiber within the given lens assembly to a location of the prescribed light beam waist diameter.

Fig. 10

LENS ASSEMBLY FOR OPTICAL FIBER COUPLING TO TARGET AND ASSOCIATED METHODS

CLAIM OF PRIORITY

This application claims priority under 35 U.S.C. 119(e) to U.S. Provisional Patent Application No. 62/434,612, filed Dec. 15, 2016, the disclosure of which is incorporated herein by reference in its entirety for all purposes.

BACKGROUND

1. Field of the Invention

The present invention relates to optical data communication.

2. Description of the Related Art

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient mechanisms for transmitting laser light and detecting laser light at different nodes within the optical data network. In this regard, it can be necessary to transmit laser light from a chip to an optical fiber, and vice-versa. It is within this context that the present invention arises.

SUMMARY

In an example embodiment, a lens assembly for an optical fiber is disclosed. The lens assembly includes an optical gap structure having a first end and a second end and a length measured between the first and second ends of the optical gap structure. The first end of the optical gap structure is configured to attach to an end of a single-mode optical fiber. The optical gap structure is formed of a material that provides for propagation of a beam of light through the optical gap structure in approximately free diffraction. The lens assembly also includes a multi-mode optical fiber having a first end and a second end and a length measured between the first and second ends of the multi-mode optical fiber. The first end of the multi-mode optical fiber is attached to the second end of the optical gap structure. The length of the optical gap structure and the length of the multi-mode optical fiber are set to provide a prescribed working distance and a prescribed light beam waist diameter. The prescribed working distance is a distance measured from the second end of the multi-mode optical fiber to a location of the prescribed light beam waist diameter.

In an example embodiment, a chip assembly is disclosed as including a plurality of lens assemblies connected to a chip. Each lens assembly includes a respective optical gap structure and a respective multi-mode optical fiber. Each optical gap structure has a first end and a second end and a length measured between the first and second ends of the optical gap structure. The first end of a given optical gap structure is configured to attach to an end of a corresponding single-mode optical fiber. Each multi-mode optical fiber has a first end and a second end and a length measured between the first and second ends of the multi-mode optical fiber. The first end of a given multi-mode optical fiber is attached to the second end of a corresponding optical gap structure. Within a given lens assembly, the length of the optical gap structure and the length of the multi-mode optical fiber are set to provide a prescribed working distance and a prescribed light beam waist diameter. The prescribed working distance is a distance measured from the second end of the multi-mode optical fiber within the given lens assembly to a location of the prescribed light beam waist diameter.

In an example embodiment, a method is disclosed for manufacturing a lens assembly for an optical fiber. The method includes forming an optical gap structure to have a first end and a second end and a length measured between the first and second ends of the optical gap structure. The first end of the optical gap structure is configured to attach to an end of a single-mode optical fiber. The method also includes forming a multi-mode optical fiber to have a first end and a second end and a length measured between the first and second ends of the multi-mode optical fiber. The method also includes attaching the first end of the multi-mode optical fiber to the second end of the optical gap structure. The length of the optical gap structure and the length of the multi-mode optical fiber are set to provide a prescribed working distance and a prescribed light beam waist diameter. The prescribed working distance is a distance measured from the second end of the multi-mode optical fiber to a location of the prescribed light beam waist diameter.

In an example embodiment, a method is disclosed for manufacturing a chip assembly. The method includes connecting a plurality of lens assemblies to a chip. Each lens assembly includes a respective optical gap structure and a respective multi-mode optical fiber. Each optical gap structure has a first end and a second end and a length measured between the first and second ends of the optical gap structure. The first end of a given optical gap structure is attached to an end of a corresponding single-mode optical fiber. Each multi-mode optical fiber has a first end and a second end and a length measured between the first and second ends of the multi-mode optical fiber. The first end of a given multi-mode optical fiber is attached to the second end of a corresponding optical gap structure. Within a given lens assembly, the length of the optical gap structure and the length of the multi-mode optical fiber are set to provide a prescribed working distance and a prescribed light beam waist diameter. The prescribed working distance is a distance measured from the second end of the multi-mode optical fiber within the given lens assembly to a location of the prescribed light beam waist diameter.

In an example embodiment, a method is disclosed for manufacturing a lens assembly for an optical fiber. The method includes attaching a first end of an optical gap structure to an end of a single mode optical fiber. The method also includes cleaving the optical gap structure to form a second end of the optical gap structure. The method also includes attaching a first end of a multi-mode optical fiber to the second end of the optical gap structure. The method also includes cleaving the multi-mode optical fiber to form a second end of the multi-mode optical fiber.

BRIEF DESCRIPTION OF THE DRAWINGS

FIG. 5 shows an interface of eight instances of the lens assembly with a chip, in accordance with an example embodiment of the present invention.

FIG. 6 shows a top-down view of the chip of FIG. 5, in accordance with some embodiments of the present invention.

FIG. 10 shows a flowchart of a method for manufacturing a chip assembly, in accordance with some embodiments of the present invention.

DETAILED DESCRIPTION

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.

In an integrated photonic chip application, it is necessary to couple light from an optical fiber to the integrated photonic chip. Some techniques for coupling light from the optical fiber to the integrated photonic chip include endface-coupling and vertical coupling from the chip, where the vertical-coupling includes use of vertical grating couplers. When vertical grating couplers are used, it is necessary to package the chip and optical fibers so that the optical beam effectively couples from one to the other. An example technique for coupling the optical fiber to the chip includes butt-coupling the optical fiber to the chip, with a mechanical support holding the optical fiber axis normal or slightly off-normal to the chip, in accordance with the grating design implemented within the chip.

To improve mechanical stability of an optical fiber attachment to a chip, the optical fiber can be attached parallel to the chip outer surface (in a parallel-coupled configuration) rather than perpendicular to the chip outer surface (in a butt-coupled configuration). In the parallel-coupled configuration, a reflective surface can be used to orient the light from the optical fiber into an approximately perpendicular direction relative to the chip outer surface for coupling of the light into the chip's vertical grating coupler. A problem arises, however, in that it is no longer possible to have a very short (or no) working distance between the core of the optical fiber and the vertical grating coupler of the chip, as is present when the optical fiber is butt-coupled to the chip. Because of this, with the parallel-coupled configuration of the optical fiber to the chip, the light disperses in the region in between the optical fiber core and the vertical grating coupler of the chip. The minimum distance of that dispersion region is dictated by the width of the optical fiber cladding, since the axis of the optical fiber is oriented parallel to the outer surface of the chip. Lensing can be used to overcome the light dispersion effect and enable low-loss coupling over longer coupling distance. Embodiments are disclosed herein for creating a lens assembly for use in attaching an optical fiber to a chip in the parallel-coupled configuration.

Figure 1:
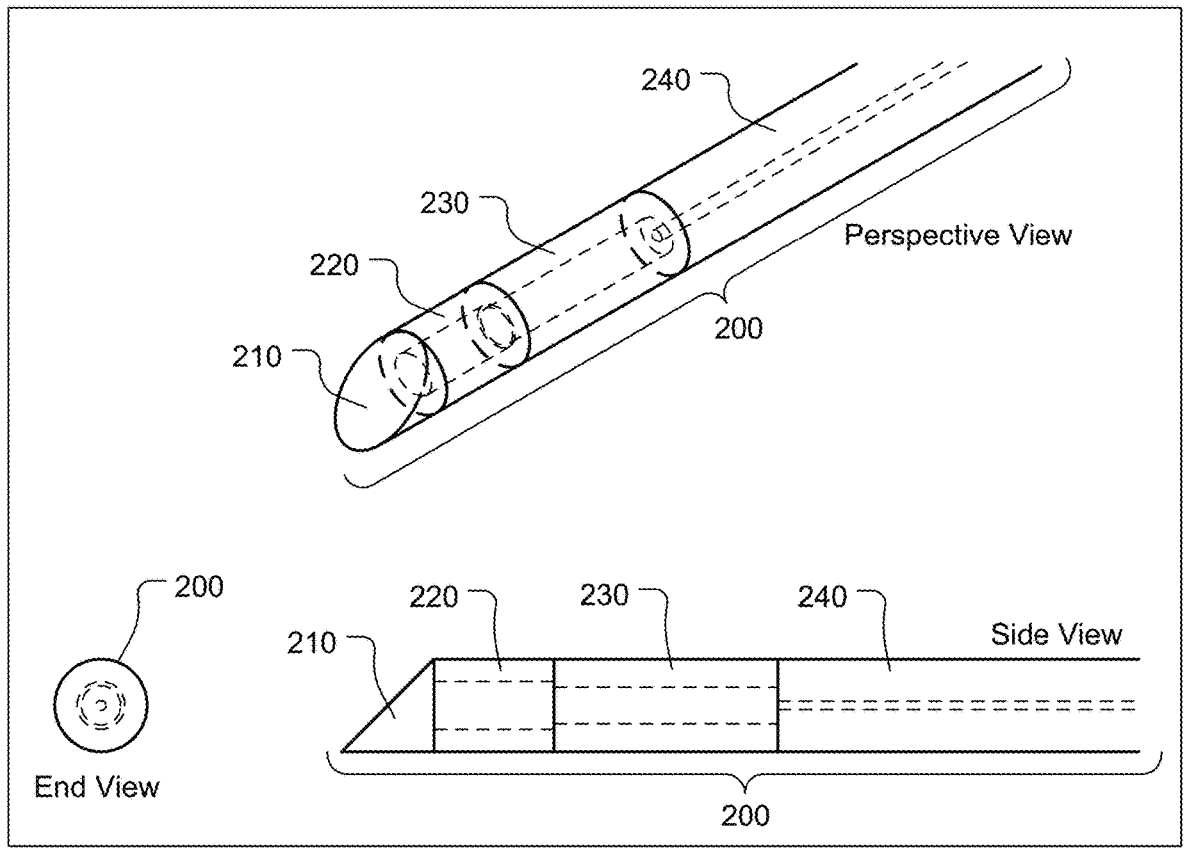
FIG. 1 shows a lens assembly for use in attaching an optical fiber to a chip in a parallel-coupled configuration, in accordance with some embodiments of the present invention.

FIG. 1 shows a lens assembly 200 for use in attaching an optical fiber to a chip in a parallel-coupled configuration, in accordance with some embodiments of the present invention. The lens assembly 200 can be considered a type of GRIN lens assembly. The lens assembly 200 includes four regions: 1) a single mode fiber (SMF) 240 region, 2) an optical gap structure 230 region, 3) a multi-mode optical fiber (MMF) 220 (graded index MMF) region, and 4) an optical end structure 210 region. The optical end structure 210 is optional. In some embodiments, the outer diameters of the optical end structure 210, the MMF 220, the optical gap structure 230, and the SMF 240 are similar. If the outer diameters of the optical end structure 210, the MMF 220, the optical gap structure 230, and the SMF 240 are similar, or approximately the same, it allows the optical end structure 210, the MMF 220, the optical gap structure 230, and the SMF 240 to be fusion spliced using commercially available equipment and leads to better alignment of the light beam with the center of the lens assembly 200, including with the center of the SMF 240. In an example embodiment, the outer diameter of each of the optical end structure 210, the MMF 220, the optical gap structure 230, and the SMF 240 is approximately 125 micrometers (μm). However, it should be understood that in other embodiments the outer diameter of each of the optical end structure 210, the MMF 220, the optical gap structure 230, and the SMF 240 can be either less than or greater than 125 μm.

In some embodiments, the optical gap structure 230 is a coreless fiber. For example, in some embodiments, the optical gap structure 230 is a 125 μm outer diameter coreless/acrylate termination optical fiber, such as that provided by the company OFS as their Item No. F15330, by way of example. It should be understood, however, that in other embodiments the optical gap structure 230 can be another type of coreless fiber. Also, in some embodiments, the optical gap structure 230 is a step-index MMF. For example, in some embodiments, the optical gap structure 230 is a 50 μm core diameter/125 μm outer diameter step-index MMF, such as that provided by Prysmian Group as DrakaElite Specialty Fiber—RadHard 50 μm Step-Index Multimode Fibre, by way of example. It should be understood, however, that in other embodiments the optical gap structure 230 can be another type of MMF.

Figure 2:
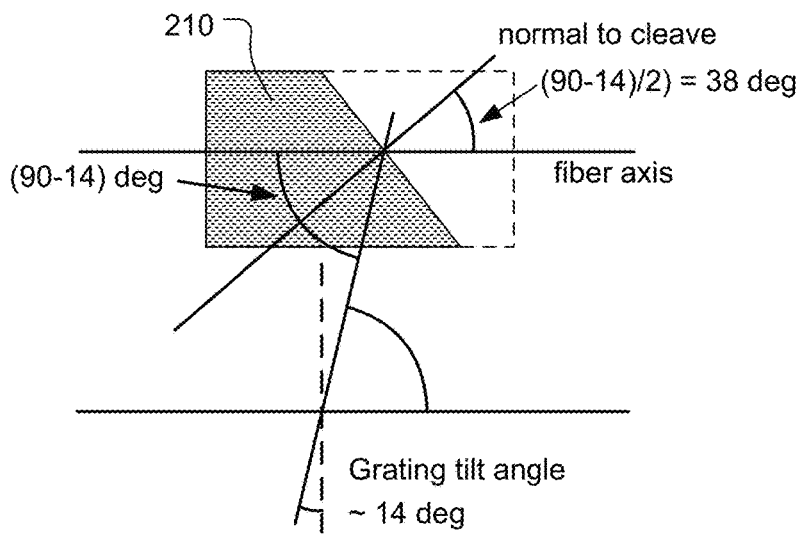
FIG. 2 shows an example cleaving of the optical end structure with example angles, in accordance with some embodiments of the present invention.

In some embodiments, the lens assembly 200 does not include the optical end structure 210. In some embodiments, the optical end structure 210 can be a region filled with epoxy or other polymer approximately index-matched to the MMF 220. In other embodiments, the MMF 220 can be cleaved normal to the surface (i.e., substantially perpendicular to the axis of the lens assembly 200) or at an angle (i.e., at an angle relative to the axis of the lens assembly 200) if a lateral beam is desired. However, in some embodiments, the optical end structure 210 is present and is cleaved normal to the axis of the lens assembly 200. In some embodiments, the optical end structure 210 is present and is cleaved at an angle relative to the axis of the graded index MMF 220, or the optical gap structure 230, or the SMF 240. With an appropriate cleave, the optical end structure 210 functions as a turning prism for the light that it receives from the graded index MMF 220. FIG. 2 shows an example cleaving of the optical end structure 210 with example angles, in accordance with some embodiments of the present invention.

In some embodiments, the end-face of the optical end structure 210 (i.e., the face opposite of the graded index MMF 220) is coated with a metallic mirror or a dielectric mirror. In some embodiments where the coating on the end-face of the optical end structure 210 is a dielectric mirror, the coating can include a layered stack, enabling broadband reflection. Also, in the embodiments where the end-face of the optical end structure 210 is coated with the mirror, the end-face will continue to function as the mirror when it is coated with an optical index matching epoxy.

In some embodiments of the lens assembly 200, the MMF 220 is a graded index MMF. For example, in some embodiments, the MMF 220 is a 62.5 µm core diameter/125 µm outer diameter acrylate silica fiber, such as that provided by the company OFS as their Item No. BF04431-01, by way of example. It should be understood, however, that in other embodiments the MMF 220 can be another type of graded index MMF.

In some example embodiments, the SMF 240 is an optical fiber such as SMF-28 Ultra Optical Fiber provided by the company Corning, by way of example. In some example embodiments, the SMF 240 is compliant with the ITU-T G.652 standard. In some example embodiments, the SMF 240 is a Polarization Maintaining Fiber (PMF). For example, in some embodiments where the SMF 240 is a PMF, the birefringent axes can be aligned relative to the cleaved angle of the optical end structure 210, if present. For example, the slow axis of the PMF can be aligned at 0°, 90°, or at any arbitrary angle relative to the major axis of the cleave of the optical end structure 210, if present. In some example embodiments, the SMF 240 is a PANDA optical fiber provided by the company Corning, by way of example. Additionally, in some embodiments, multiple SMF's 240 and corresponding lens assemblies 200 are attached to the chip in the parallel-coupled configuration with the multiple SMF's 240 configured as an optical fiber array/ribbon. In these optical fiber array/ribbon embodiments, the multiple SMF's 240 can be any combination of optical fibers, such as SMF-28 Ultra Optical Fiber and PANDA optical fiber, by way of example, as well as any other type of SMF 240.

Figure 3:
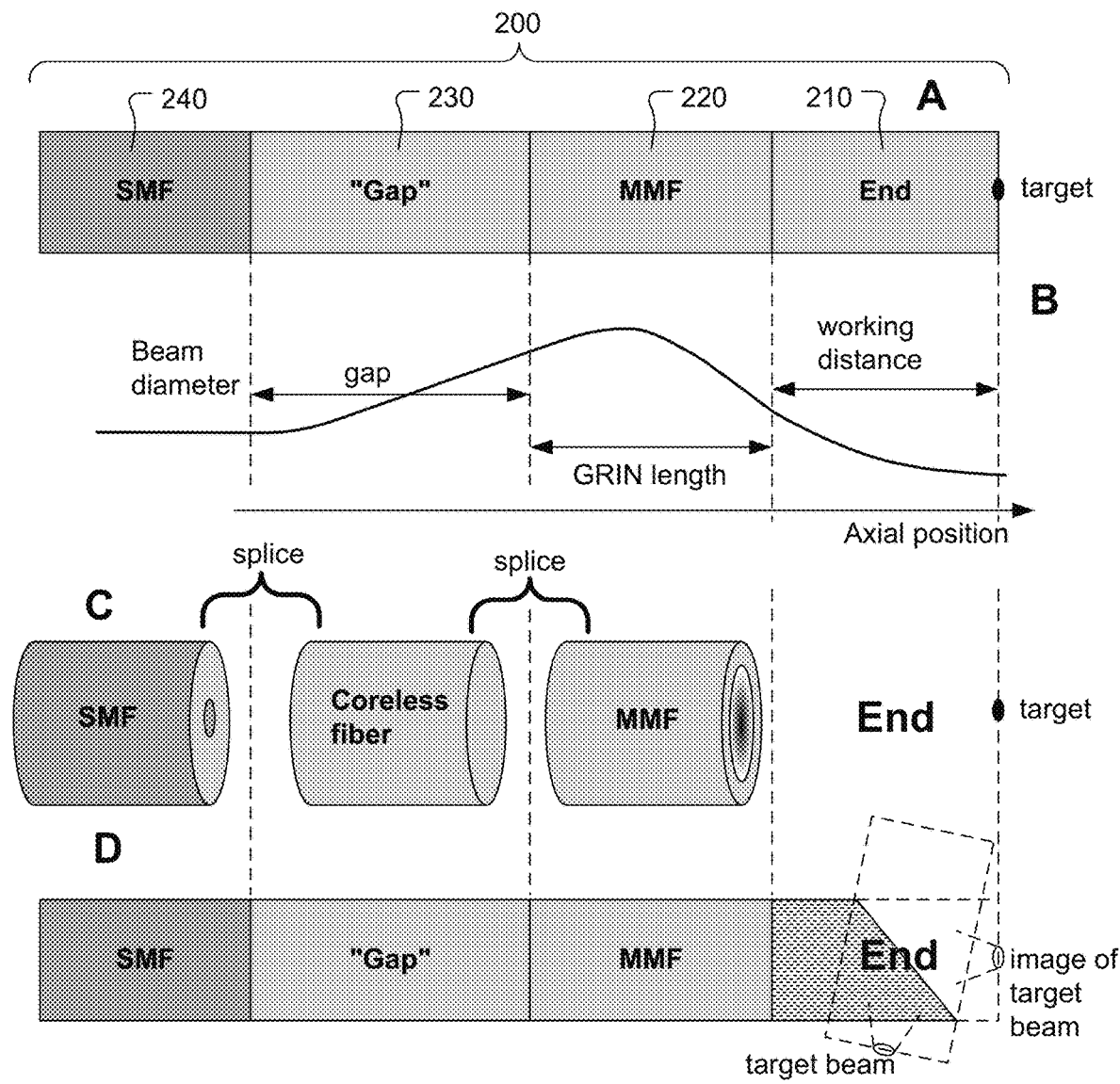
FIG. 3 shows additional information about the lens assembly, in accordance with some example embodiments of the present invention.

FIG. 3 shows additional information about the lens assembly 200, in accordance with some example embodiments of the present invention. Section "a" of FIG. 3 shows how the beam of light passes from the SMF 240 through the optical gap structure 230 through the MMF 220 through the optical end structure 210 to a target. Section "b" of FIG. 3 shows a plot illustrating an evolution of a size, i.e., diameter, of the beam of light as a function of axial position along the lens assembly 200. In the SMF 240, the beam of light is guided in a single-mode waveguide core. Therefore, in the SMF 240, the beam of light has a constant beam diameter determined by the fiber mode. In the optical gap structure 230, the beam of light propagates in approximately free diffraction in an unguided, constant, or nearly-constant optical index medium. Therefore, in the optical gap structure 230, the diameter of the beam of light expands. In the MMF 220, the beam of light is subjected to focusing associated with a graded-index medium. In various embodiments, the material of the MMF 220, and/or the length of the MMF 220, and/or the length of the optical gap structure 230 can be defined to make the beam of light collimated, diverging, or converging as the beam of light leaves the MMF 220, as discussed below with regard to FIG. 4A.

Section "c" of FIG. 3 shows an example of how the lens assembly 200 can be formed by splicing. In some embodiments, such as that depicted in FIG. 3, the optical gap structure 230 can be a coreless fiber having an outer diameter and a refractive index that substantially matches those of the SMF 240. The lens assembly 200 is formed by splicing the coreless fiber of the optical gap structure 230 to both the SMF 240 and the MMF 220. In some embodiments of the lens assembly 200, additional elements can be spliced, including one or more elements forming the optical end structure 210. For example, in some embodiments, the optical end structure 210 can include a second coreless fiber spliced onto the MMF 220, with the coreless fiber of the optical end structure 210 having an angled cleave configured to reflect the beam of light, where the angled cleave is located at the terminal end of the coreless fiber of the optical end structure 210 opposite from the MMF 220.

Section "d" of FIG. 3 shows how the path of the beam of light can be folded by one or more reflections within the optical end structure 210. The folded path of the beam of light, such as shown in Section "d" of FIG. 3, can be considered approximately equivalent to a straight path of the beam of light, such as shown in Section "a" of FIG. 3, where elements of the folded path (such as the target beam) are represented by their images ("image of the target beam").

The lens assembly 200 is configured to deliver a beam of light from the SMF 240 to a target. In some embodiments, the lens assembly 200 can be configured to deliver the beam of light onto a surface or region, such as the active region of a detector. In some embodiments, the target can be a set of target beam parameters, so that the loss of the optical system is approximately the overlap between the propagating beam of light and the target beam of light. The target beam of light may be approximated by a Gaussian, or may be determined by a coupler (such as an optical grating coupler).

Additionally, it should be understood that the lens assembly 200 disclosed herein is bidirectional. More specifically, while the lens assembly 200 is described herein with regard to the beam of light passing from the SMF 240 to the target, it should be understood that the beam of light can propagate in the opposite direction from the target to the SMF 240, such as when the target is a source beam of light and the SMF 240 functions as an optical output.

FIGS. 4A through 4E show simulation results for the lens assembly 200 disclosed herein, in accordance with some example embodiments of the present invention. The simulation results are calculated from a standard ABCD-matrix approach. For the simulation, the initial beam is assumed to be approximately Gaussian with radius $w_{in}$=4.75 µm. Also, for the simulation, the MMF 220 has a core diameter of 62.5 µm and a numerical aperture (NA) of 0.275, which is representative of commercially available MMF. The primary design parameters used to achieve a desired working distance and waist diameter are the length of the MMF 220 and the length of the optical gap structure 230 (e.g., the length of the coreless fiber), which can be readily controlled during fabrication of the lens assembly 200. Selection or custom design of the optical fibers provide additional design freedom. In particular, core diameter and NA of the MMF 220 are useful design parameters.

Figure 4A:
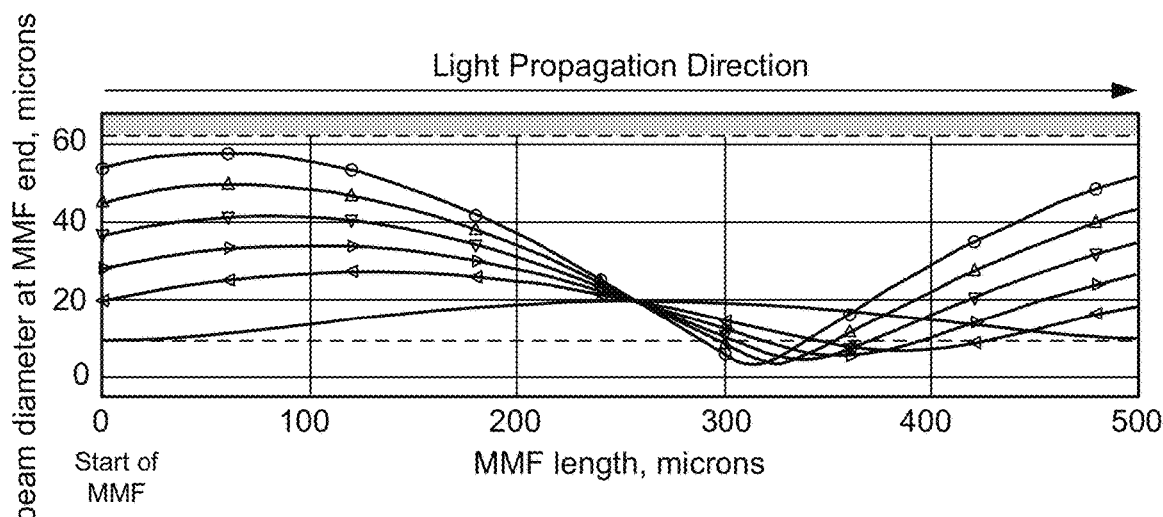
FIG. 4A shows how the diameter of the beam of light evolves as a function of position at each position along the MMF relative to the start of the MMF within the lens assembly, in accordance with some embodiments of the present invention.

FIG. 4A shows how the diameter of the beam of light evolves as a function of position at each position along the MMF 220 relative to the start of the MMF 220 within the lens assembly 200, i.e., relative to the end of the MMF 220 that is attached to the optical gap structure 230, in accordance with some embodiments of the present invention. FIG. 4A shows the diameter of the beam of light exiting the MMF 220 as a function of the length of the MMF 220. Each trace in FIG. 4A represents a different length of the optical gap structure 230. The legend for the length of optical gap structure 230 as shown in FIG. 4C applies to each of FIGS. 4A, 4B, and 4C. FIG. 4A shows that as the length of the optical gap structure 230 gets larger, the diameter of the beam of light at the input to the MMF 220 (i.e., at "MMF length"=0 in the plot) gets larger, since the beam of light has a greater distance of free diffraction in the optical gap structure 230 when the length of the optical gap structure 230 is larger.

The length of the optical gap structure 230 should be small enough to ensure that the beam of light does not interact with the edge of the core of the MMF 220. Also, a larger length of the optical gap structure 230 provides for a tighter focusing of the spot at the target, i.e., provides for a smaller waist diameter at the target. The length of the optical gap structure 230 should be selected so that the diameter of the beam of light does not exceed the diameter of the core of the MMF 220 anywhere within the MMF 220. Therefore, in the simulation example, the length of the optical gap structure 230 is selected so that the diameter of the beam of light does not exceed 62.5 μm anywhere in the MMF 220. Also, since the beam of light has power outside of its beam diameter, the length of the optical gap structure 230 should be selected to ensure that the diameter of the beam of light within the MMF 220 is substantially smaller than the core diameter of the MMF 220. For example, in some embodiments, the length of the optical gap structure 230 can be selected to ensure that the diameter of the beam of light within the MMF 220 is no greater than 70% of the core diameter of the MMF 220.

Figure 4B:
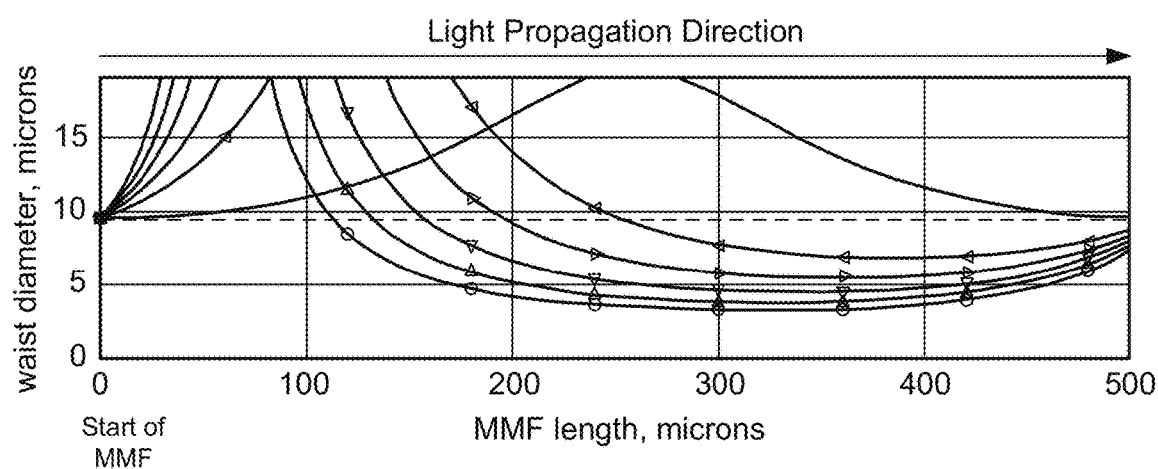
FIG. 4B shows the waist diameter of the beam of light that will result in the optical end structure, in accordance with some embodiments of the present invention.
Figure 4C:
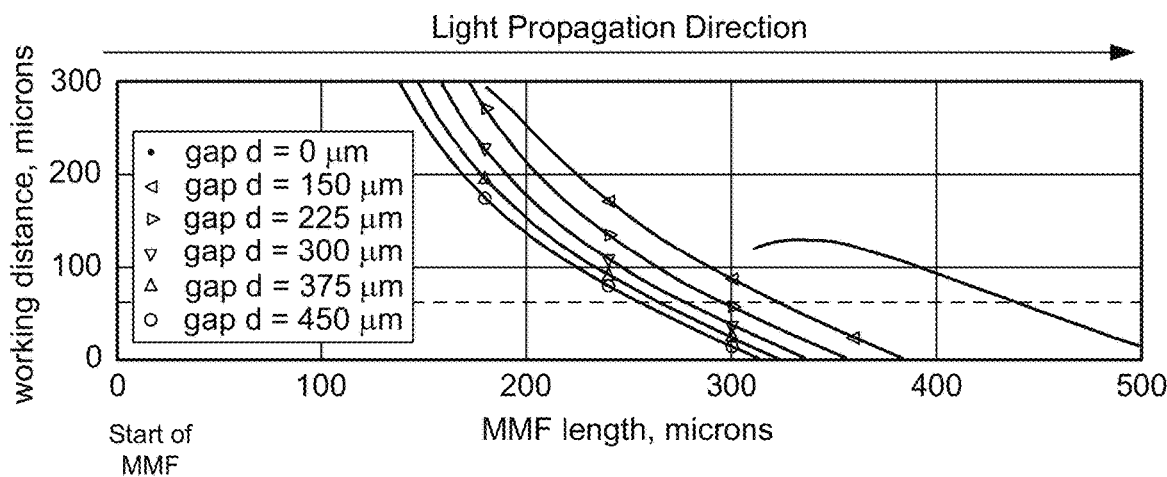
FIG. 4C shows the working distance (relative to the end of the MMF) at which this focused beam waist occurs, in accordance with some embodiments of the present invention.

FIG. 4B shows the waist diameter of the beam of light that will result in the optical end structure 210 assuming the optical end structure 210 has a uniform index of 1.45, in accordance with some embodiments of the present invention. FIG. 4C shows the working distance (relative to the end of the MMF 220) at which this focused beam waist occurs, in accordance with some embodiments of the present invention.

Figure 4D:
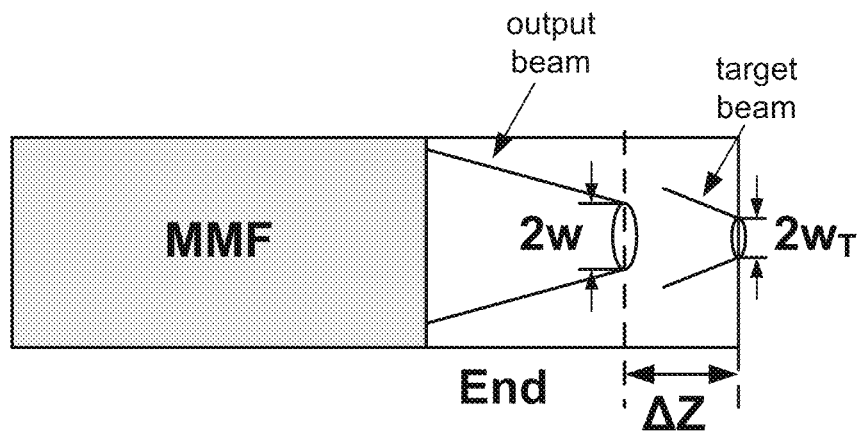
FIG. 4D shows how in practice the output beam of light can have some mismatch from the desired target beam of light, in accordance with some embodiments of the present invention.

FIG. 4D shows how in practice the output beam of light can have some mismatch from the desired target beam of light, in accordance with some embodiments of the present invention. For example, the diameter of the output beam of light ($2w$) may differ from the desired diameter of the target beam of light ($2w_T$), or there may be an offset $\Delta Z$ in the offset position. Also, in some embodiments, there may be differences in angle, beam shape, etc., between the output beam of light and the target beam of light.

The "target distance" is defined as the distance from the MMF 220 endface to the target, where the MMF 220 endface is the end of the MMF 220 that is closest to the target. The "working distance" is defined as the distance from the MMF 220 endface to the waist of the converging beam of light. Low loss will be achieved when the physical target distance approximately matches the working distance, since that is when a focused spot appears at the target. The loss as a function of distance mismatch ($\Delta Z$=target distance—working distance), or as a function of beam size, i.e., mode size, mismatch can be estimated as follows:

$$\text{Loss (dB) of distance mismatch}=10 \log 10[1+(\text{constant})(\Delta Z)^2/w^4],  \quad \text{Equation 1.}$$

$$\text{Loss (dB) of beam size mismatch}=10*\log 10(4/(w/w_T+w_T/w)^2), \quad \text{Equation 2.}$$

wherein w is the radius of the output beam of light, and $w_T$ is the radius of the target beam of light.

Figure 4E:
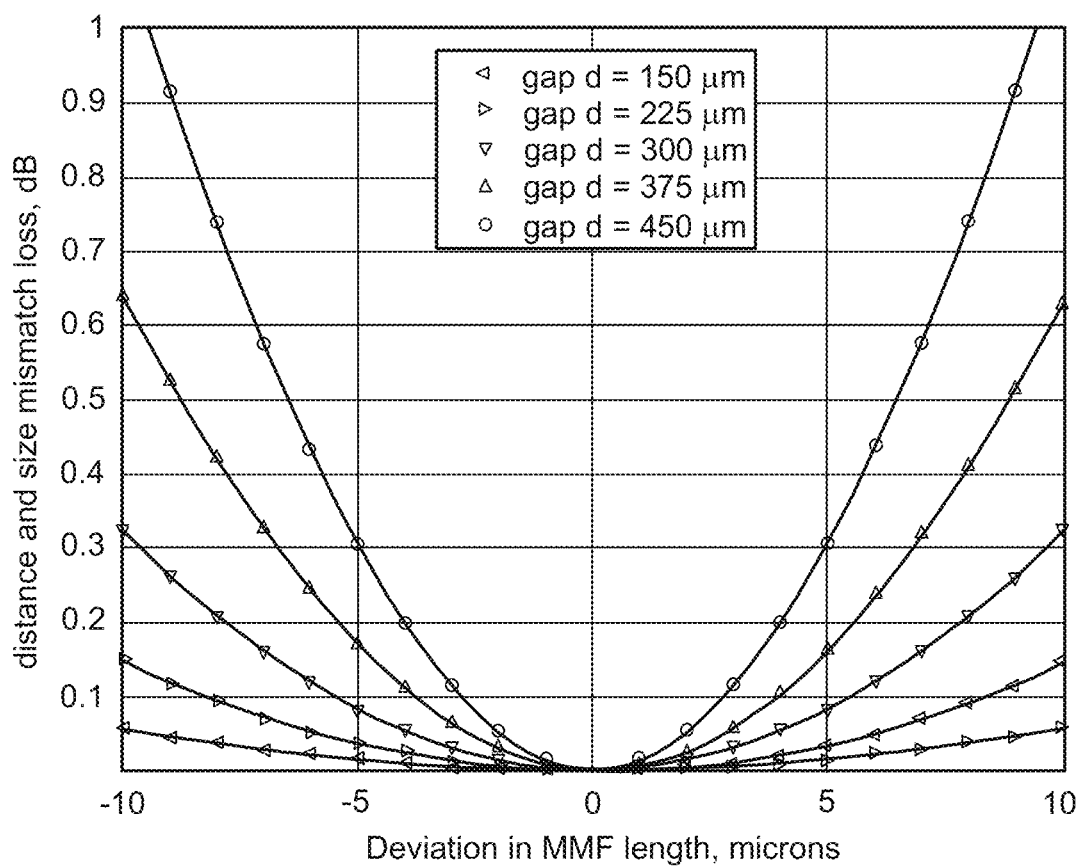
FIG. 4E shows a plot of an estimated combination of distance-mismatch loss and beam size mismatch loss, in accordance with some embodiments of the present invention.

FIG. 4E shows a plot of an estimated combination of distance-mismatch loss and beam size mismatch loss, by assuming a target distance of 250 μm, in accordance with some embodiments of the present invention. In FIG. 4E, loss is plotted as a function of the deviation in MMF 220 length, defined as the actual MMF 220 length minus the ideal MMF 220 length (for which the target distance and the working distance are equal). In this manner, FIG. 4E combines the sensitivity of working distance to MMF 220 length plotted in FIG. 4C with the loss formulas of Equations 1 and 2 above. The particular ABCD-matrix calculations of FIGS. 4A-4E assume the beam of light has an optical wavelength of 1280 nanometers (nm) (in vacuum). However, it should be understood that various embodiments of the lens assembly 200 can be configured for use with light beams of essentially any other wavelength, and particularly for use with light beams having wavelengths of 1310 nm or 1550 nm, which are commonly used in data communication applications.

In some example embodiments, the length of the optical gap structure 230 is within a range extending from zero to about 500 μm. In some example embodiments, the length of the optical gap structure 230 is within a range extending from about 75 μm to about 450 μm. In some example embodiments, the length of the optical gap structure 230 is within a range extending from about 150 μm to about 300 μm. In some example embodiments, the length of the MMF 220 is within a range extending from about 100 μm to about 450 μm, or falls within this range plus a multiple of the MMF 220 period, i.e., modulo the period of the MMF 220. In some example embodiments, the length of the MMF 220 is within a range extending from about 150 μm to about 350 μm, or falls within this range plus a multiple of the MMF 220 period, i.e., modulo the period of the MMF 220. In some example embodiments, the length of the MMF 220 is within a range extending from about 150 μm to about 250 μm, or falls within this range plus a multiple of the MMF 220 period, i.e., modulo the period of the MMF 220. The above-described ranges for the lengths of the optical gap structure 230 and the MMF 220 provide for a beam waist diameter within a range extending from about 5 μm to about 10 μm, and for a working distance within a range extending from about 60 μm to about 300 μm. These waist diameter and working distance ranges are useful in many applications and provide adequate sensitivity to manufacturing variations.

For example, in some embodiments, the lens assembly 200 is designed with low enough sensitivity that less than 0.2 dB of loss is induced, or less than 0.05 dB of loss is induced, due to the manufacturing repeatability of MMF 220 length and the optical gap structure 230 length. In some embodiments, the MMF 220 length and optical gap structure 230 length repeatability for the lens assembly 200 process may be within 2 μm. In some embodiments, the MMF 220 length and optical gap structure 230 length repeatability for the lens assembly 200 process may be within 5 μm. In some embodiments, the lens assembly 200 design is able to tolerate up to 5 μm variation in the lengths of the MMF 220 and the optical gap structure 230. And, in some embodiments, the lens assembly 200 design is able to tolerate more than 5 μm variation in the lengths of the MMF 220 and the optical gap structure 230. Also, as previously mentioned, the lens assembly 200 is configured to ensure that the beam of light avoids large interaction with the MMF 220 core edge within the MMF 220. The lens assembly 200 will similarly avoid impairments associated with interactions with a large-radius portion of the optical gap structure 230 (for example, if a large-core step-index fiber is used to approximate a coreless fiber within the optical gap structure 230).

In some embodiments, the SMF 240 can include a multi-core optical fiber with single-mode cores, and the MMF 220 can include a multi-core optical fiber with multi-mode graded-index cores aligned to the multiple cores of the optical fibers in the SMF 240. In some embodiments, the multiple cores of the SMF 240 may be arranged in a horizontal line (in this context, horizontal can be defined as orthogonal to the cleave normal, or parallel to the plane of the chip, in fiber-to-chip coupling applications) to facilitate an arrangement where each core corresponds to a target, all at the same target distance. In these embodiments, the working distance of each beam can be the same. In some embodiments, the multiple cores of the SMF 240 can be at different vertical positions (i.e., not all on a horizontal line), and the lens assembly 200 can be configured so that each beam corresponding to a core has a working distance substantially equal to the target distance for that beam.

The lens assembly 200 described herein has utility for any application that is serviceable by GRIN lens assemblies. For example, the lens assembly 200 described herein can be used in OCT, fiber-to-fiber coupling, and many other applications. An example implementation of the lens assembly 200 in the application of fiber-to-chip coupling is described below.

FIG. 5 shows an interface of eight instances of the lens assembly 200 (e.g., 200-1 through 200-8) with a chip 600, in accordance with an example embodiment of the present invention. The chip 600 can include various devices, such as optical, electrical, electro optic, and combinations thereof. In some embodiments, the chip 600 includes Si, GaAs, InP, InGaAsP, Ge, GaN, etc. In some embodiments, the chip 600 is a CMOS chip. In some embodiments, the chip 600 has both CMOS circuits and optical circuits. In these embodiments, the chip 600 can include custom logic, CPUs, GP-GPUs, switch logic, DRAM, NAND, 3D XPoint, or any other logic, analog, or memory element. Also, in some embodiments, the chip 600 can include one or more vertical grating couplers to enable optical connection with one or more external optical fibers.

In some embodiments, individual lens assemblies 200 can be connected to the chip 600. However, in some embodiments, multiple instances of the lens assembly 200 (e.g., 200-1 through 200-8) can be connected to the chip 600. In these embodiments, multiple SMF's 240 can be configured as an optical fiber ribbon assembly. For example, FIG. 5 shows an array of eight optical fibers 610-1 through 610-8 connected to the chip 600, where the optical fibers 610-1 through 610-8 correspond to the SMF's 240. Each optical fiber 610-1 through 610-8 has a corresponding one of the eight lens assemblies 200-1 through 200-8. In these embodiments, after the polymer jacket (coating over the cladding of the SMF's) is removed (as part of the cleaving operation), the cleave and splice operation can continue in parallel (i.e., as ribbon assemblies). Therefore, it should be understood that multiple instances of the lens assembly 200 as described above can be simultaneously formed in a ribbon-like manner to accommodate multiple SMF 240 fibers. In some example embodiments, a number of the multiple SMF 240 fibers accommodated by multiple instances of the lens assembly 200 formed in the ribbon-like manner is 2, 4, 8, 12, 16, or 24. However, in other embodiments, any number of the multiple SMF 240 fibers can be accommodated by a corresponding number of multiple instances of the lens assembly 200 formed in the ribbon-like manner. Also, as additional optical fiber ribbons become commercially available, the number of the multiple SMF 240 fibers accommodated by the corresponding number of multiple instances of the lens assembly 200 formed in the ribbon-like manner will increase.

FIG. 5 shows a region 620 where the silicon has been thinned. For SOI (silicon-on-insulator) wafers, the handle silicon can be etched down to the buried oxide (BOX). For bulk CMOS wafers, the backside silicon can be etched down to the shallow trench isolation. The specific pattern of the region 620 can be adjusted lithographically. In FIG. 5, the region 260 includes a number of ridges 630. These ridges 630 help to align the optical fibers 610-1 through 610-8 to the vertical coupler on the chip 600. The ridges 630 can have any shape, so long as they do not interfere with the placement of the optical fibers 610-1 through 610-8. For example, in various embodiments, the ridges 630 can be V-shaped (to form V-grooves), posts, or completely absent. In some embodiments, the optical fibers 610-1 through 610-8 are epoxied to the chip 600 within the region 620. If the end face of the optical end structure 210 is not coated, then it is necessary for the end face to remain free of index matched epoxy. However, if the end face of the optical end structure 210 is coated with a reflective material, then the optical end structure 210 can be submerged in epoxy.

Figure 7:
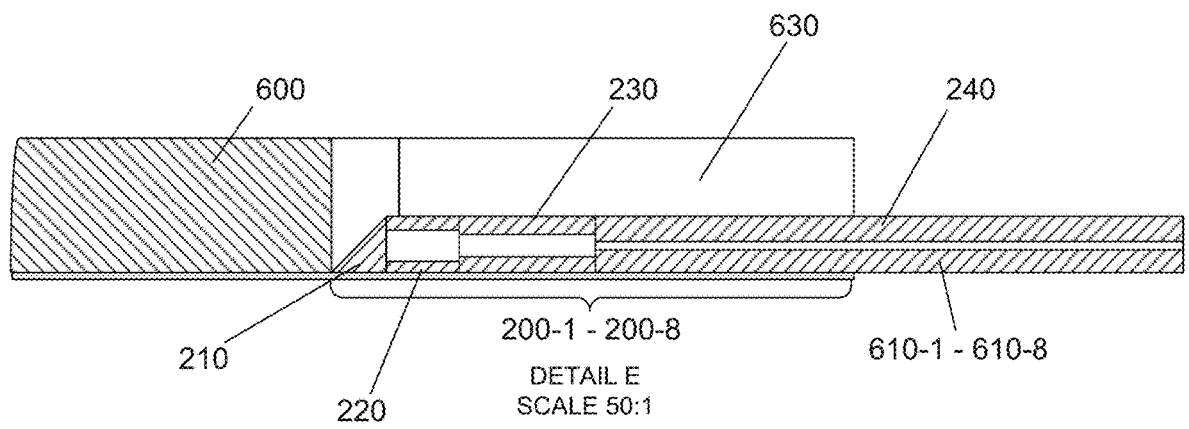
FIG. 7 shows Detail E of FIG. 6, in accordance with some embodiments of the present invention.

FIG. 6 shows a top-down view of the chip 600 of FIG. 5, in accordance with some embodiments of the present invention. FIG. 7 shows Detail E of FIG. 6, in accordance with some embodiments of the present invention. In some embodiments, the angle of the optical end structure 210 is cleaved so that the light propagation turns towards the chip 600. For example, if the chip 600 has a vertical coupler with an angle of acceptance of 14° from normal, then the end region 210 should be cleaved such that the light propagates at an angle of 14° from a reference direction perpendicular to the plane of the chip 600.

With reference back to FIG. 2, the relationship between the tilt angle of the grating and the angle of the cleave is shown. For a grating tilt angle, the angle between the optical fiber axis and the cleave normal should be (90°—tilt angle)/2. For example, for the counter-propagating configuration shown in FIG. 2, a cleave angle of about 38° is suitable for a grating tilt angle of about 14°. For a co-propagating configuration, the same formula applies, for example a cleave angle of about 52° would be suitable for a grating tilt angle of about −14°. In various embodiments, the grating tilt angle can be either positive or negative. In some example embodiments, the absolute value of the grating tilt angle is within the range extending from about 10° to about 25°. However, in other embodiments, the grating tilt angle can be less than about 10°, or greater than about 25°.

Figure 8:
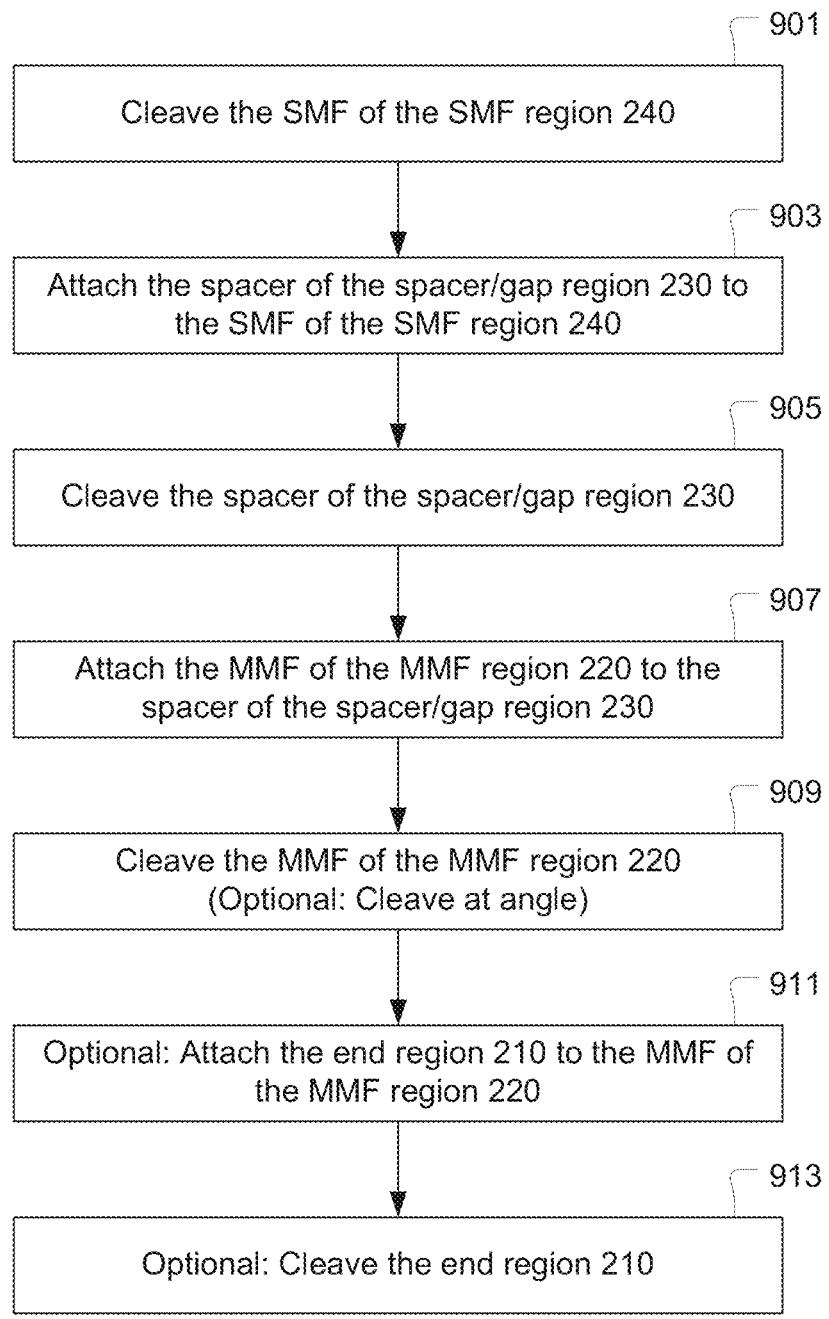
FIG. 8 shows a flowchart of a method for fabricating the lens assembly, in accordance with some example embodiments of the present invention.

FIG. 8 shows a flowchart of a method for fabricating the lens assembly 200, in accordance with some example embodiments of the present invention. This method of FIG. 8 describes the fabrication of an individual lens assembly 200. However, similar steps can be made for the fabrication of a fiber array. More specifically, for fiber arrays the method includes cleaving, cleaning, and splicing fiber ribbons. The method includes an operation 901 for cleaving and cleaning the SMF 240. The method also includes an operation 903 for attaching the optical gap structure 230 to the SMF 240. In some embodiments, the operation 903 is performed by fusion splicing of the optical gap structure 230 to the SMF 240. The method also includes an operation 905 for cleaving the optical gap structure 230 to precisely set the length of the optical gap structure 230. If the optical gap structure 230 was previously set to the required length, the operation 905 can be skipped. In some embodiments, the operation 905 can be performed using a mechanical cleave. In some embodiments, the operation 905 can be performed using a laser cleave.

The method continues with an operation 907 for attaching the MMF 220 to the optical gap structure 230. In some embodiments, the operation 907 is performed by fusion splicing of the MMF 220 to the optical gap structure 230. The method also includes an operation 909 for cleaving the MMF 220 to precisely set the length of the MMF 220. If the MMF 220 was previously set to the required length, the operation 907 can be skipped. In some embodiments, the operation 907 can be performed using a mechanical cleave. In some embodiments, the operation 907 can be performed using a laser cleave. In some embodiments, operation 909 is performed to cleave the MMF 220 perpendicular to the axis of the lens assembly 200. In some embodiments, operation 909 is performed to cleave the MMF 220 at an angle relative to the axis of the lens assembly 200. For example, if the lens assembly 200 will not include the optical end structure 210, the MMF 220 can be cleaved at an angle relative to the axis of the lens assembly 200 so as to form a turning prism in-situ within the MMF 220.

Also, in some embodiments, the method can include an optional operation 911 for attaching the optical end structure 210 to the MMF 220. In some embodiments, the operation 911 is performed by fusion splicing of the optical end structure 210 to the MMF 220. If the optical end structure 210 is attached in the operation 911, the method can also include an optional operation 913 for cleaving the optical end structure 210. In some embodiments, the optical end structure 210 is cleaved perpendicular to the axis of the lens assembly 200. In some embodiments, the optical end structure 210 is cleaved at an angle relative to the axis of the lens assembly 200 in order to direct the beam of light laterally with respect to the axis of the lens assembly 200. In this manner, the cleaved optical end structure 210 functions as a turning prism for the light beam having traveled through the lens assembly 200, thereby turning the light beam from the axis of the lens assembly 200 toward a target that is not aligned with the axis of the lens assembly 200. If the optical end structure 210 was appropriately cleaved prior to its attachment in operation 911, the operation 913 can be skipped. In some embodiments, the operation 913 can be performed using a mechanical cleave. In some embodiments, the operation 913 can be performed using a laser cleave.

Various embodiments are disclosed herein for a lens assembly 200 for an optical fiber, e.g., for the SMF 240. In some embodiments, the lens assembly 200 provides for bi-directional propagation of light through the lens assembly 200. The lens assembly 200 includes the optical gap structure 230 having a first end and a second end and a length measured between the first and second ends of the optical gap structure 230. The first end of the optical gap structure 230 is configured to attach to an end of the single-mode optical fiber (SMF) 240. The lens assembly 200 also include a multi-mode optical fiber (MMF) 220 having a first end and a second end and a length measured between the first and second ends of the MMF 220. The first end of the MMF 220 is attached to the second end of the optical gap structure 230. The length of the optical gap structure 230 and the length of the MMF 220 are set to provide a prescribed working distance and a prescribed light beam waist diameter. In some embodiments, the prescribed working distance is a distance measured from the second end of the MMF 220 to a location of the prescribed light beam waist diameter. In some embodiments, the prescribed light beam waist diameter is within a range extending from about 5 micrometers to about 10 micrometers. In some embodiments, the prescribed working distance is within a range extending from about 60 micrometers to about 300 micrometers. In some embodiments, the prescribed working distance is within a range extending from about 60 micrometers to about 300 micrometers.

In some embodiments, the length of the optical gap structure 230 is set to ensure that a beam exiting at the second end of the optical gap structure 230 maintains a beam diameter substantially less than a diameter of a core of the MMF 220 as the beam of light travels along the length of the MMF 220. In some embodiments, the length of the optical gap structure 230 is set to ensure that a beam of light exiting at the second end of the optical gap structure 230 maintains a beam diameter less than about seventy percent of a diameter of a core of the MMF 220 as the beam of light travels along the length of the MMF 220. In some embodiments, the length of the optical gap structure 230 is within a range extending up to about 500 micrometers. In some embodiments, the length of the optical gap structure 230 is within a range extending from about 75 micrometers to about 450 micrometers. In some embodiments, the length of the optical gap structure 230 is within a range extending from about 150 micrometers to about 300 micrometers. In some embodiments, the length of the MMF 220 is within a range extending from about 100 micrometers to about 450 micrometers. In some embodiments, the length of the MMF 220 is within a range extending from about 150 micrometers to about 350 micrometers. In some embodiments, the length of the MMF 220 is within a range extending from about 150 micrometers to about 250 micrometers.

In some embodiments, the optical gap structure 230 is formed of a material that provides for propagation of a beam of light through the optical gap structure 230 in approximately free diffraction. In some embodiments, the material of the optical gap structure 230 has an unguided optical index. In some embodiments, the material of the optical gap structure 230 has a substantially constant optical index. In some embodiments, the optical gap structure 230 is a coreless optical fiber. In some embodiments, an outer diameter of the coreless optical fiber of the optical gap structure 230 is substantially equal to an outer diameter of the SMF 240, and a refractive index of the coreless optical fiber of the optical gap structure 230 is substantially equal to a refractive index of the SMF 240.

In some embodiments, the first end of the optical gap structure 230 is spliced to the end of the SMF 240. In some embodiments, the second end of the optical gap structure 230 is spliced to the first end of the MMF 220. In some embodiments, the second end of the optical gap structure 230 is spliced to the first end of the MMF 220. In some embodiments, the optical gap structure 230 is configured such that a diameter of a beam of light expands as it travels through the optical gap structure 230.

In some embodiments, the MMF 220 is formed of a material that causes focusing of a beam of light as the beam of light travels through the MMF 220. In some embodiments, the material of the MMF 220 has a graded optical index. In some embodiments, one or more of the length of the MMF 220, a material of the MMF 220, and the length of the optical gap structure 230 is defined to cause collimation of a beam of light at the second end of the MMF 220. In some embodiments, one or more of the length of the MMF 220, a material of the MMF 220, and the length of the optical gap structure 230 is defined to cause divergence of a beam of light at the second end of the MMF 220. In some embodiments, one or more of the length of the MMF 220, a material of the MMF 220, and the length of the optical gap structure 230 is defined to cause convergence of a beam of light at the second end of the MMF 220.

In some embodiments, the second end of the MMF 220 is configured to have a planar surface oriented substantially perpendicular to an axis of the lens assembly 200. In some embodiments, the second end of the MMF 220 is configured to have a planar surface oriented non-perpendicular to an axis of the lens assembly 200. In some embodiments, the planar surface of the second end of the MMF 220 is covered by a mirror material. In some embodiments, the mirror material is a metallic material. In some embodiments, the mirror material is a dielectric material. In some embodiments, the mirror material includes one or more layers of dielectric material. In some embodiments, the mirror material is formed as a layered stack of materials. In some embodiments, an angle measured between a line oriented normal to the planar surface of the second end of the MMF 220 and an axis of the MMF 220 is substantially equal to one-half of an angular quantity given by ninety degrees minus a grating tilt angle of an optical grating into which a light beam is to be directed from the planar surface of the second end of the MMF 220. In some embodiments, an angle measured between a line oriented normal to the planar surface of the second end of the MMF 220 and an axis of the MMF 220 is within a range extending from about 30 degrees to about 60 degrees.

In some embodiments, the lens assembly 200 includes an optical end structure 210 having a first end attached to the second end of the MMF 220. In some embodiments, the optical end structure 210 is formed by a coreless optical fiber. In some embodiments, an outer diameter of the coreless optical fiber of the optical end structure 210 is substantially equal to an outer diameter of the MMF 220. In some embodiments, the first end of the optical end structure 210 is spliced to the second end of the MMF 220. In some embodiments, a second end of the optical end structure 210 is configured to have a planar surface oriented substantially perpendicular to an axis of the lens assembly 200. In some embodiments, a second end of the optical end structure 210 is configured to have a planar surface oriented non-perpendicular to an axis of the lens assembly 200. In some embodiments, the planar surface of the second end of the optical end structure 210 is covered by a mirror material. In some embodiments, the mirror material is a metallic material. In some embodiments, the mirror material is a dielectric material. In some embodiments, the mirror material includes one or more layers of dielectric material. In some embodiments, the mirror material is formed as a layered stack of materials.

In some embodiments, an angle measured between a line oriented normal to the planar surface of the second end of the optical end structure 210 and an axis of the MMF 220 is substantially equal to one-half of an angular quantity given by ninety degrees minus a grating tilt angle of an optical grating into which a light beam is to be directed from the planar surface of the second end of the optical end structure 210. In some embodiments, an angle measured between a line oriented normal to the planar surface of the second end of the optical end structure 210 and an axis of the MMF 220 is within a range extending from about 30 degrees to about 60 degrees.

In some embodiments, the lens assembly 200 is connected to a chip in a configuration that provides for direction of a beam of light from the lens assembly 200 into the chip. In some embodiments, an axis of the lens assembly 200 is oriented parallel to an outer surface of the chip. In some embodiments, a chip assembly includes a plurality of lens assemblies 200 connected to a chip. Each lens assembly 200 of the plurality of lens assemblies 200 includes a respective optical gap structure 230 and a respective MMF 220. Each optical gap structure 230 has a first end and a second end and a length measured between the first and second ends of the optical gap structure 230. The first end of a given optical gap structure 230 is configured to attach to an end of a corresponding SMF 240. Each MMF 220 has a first end and a second end and a length measured between the first and second ends of the MMF 220. The first end of a given MMF 220 is attached to the second end of a corresponding optical gap structure 230. Within a given lens assembly 200, the length of the optical gap structure 230 and the length of the MMF 220 are set to provide a prescribed working distance and a prescribed light beam waist diameter. In some embodiments, the prescribed working distance is a distance measured from the second end of the MMF 220 within the given lens assembly 200 to a location of the prescribed light beam waist diameter.

In some embodiments, the plurality of lens assemblies are connected to the chip in a parallel-coupled configuration. In some embodiments, the plurality of SMF's 240 connected to the plurality of lens assemblies 200 are configured as an optical fiber array or as an optical fiber ribbon. In some embodiments, adjacent ones of the plurality of lens assemblies 200 are separated by one or more structures formed within the chip, e.g., by one or more ridges 630 as described with regard to FIGS. 5 through 7.

Figure 9:
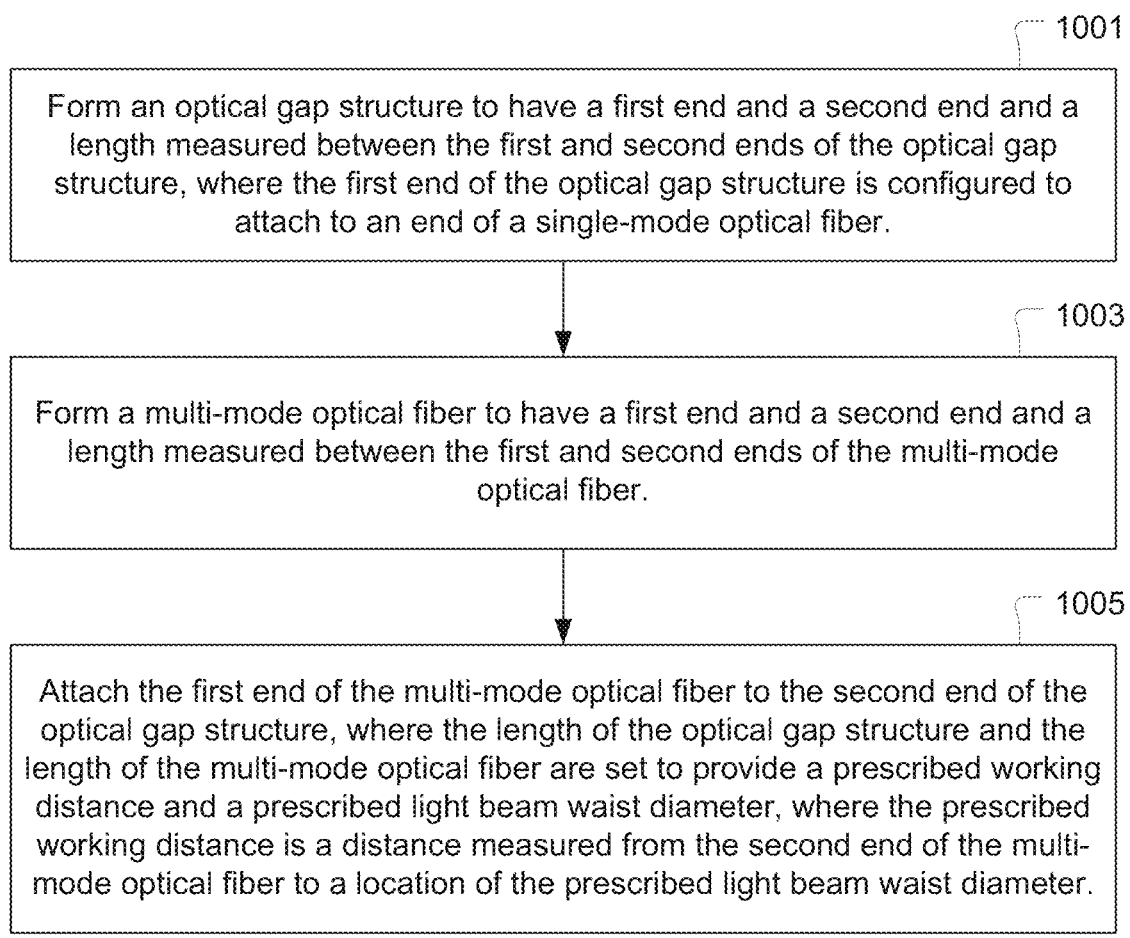
FIG. 9 shows a flowchart of a method for manufacturing a lens assembly for an optical fiber, in accordance with some embodiments of the present invention.

FIG. 9 shows a flowchart of a method for manufacturing a lens assembly 200 for an optical fiber, in accordance with some embodiments of the present invention. The method includes an operation 1001 for forming an optical gap structure 230 to have a first end and a second end and a length measured between the first and second ends of the optical gap structure 230. The first end of the optical gap structure 230 is configured to attach to an end of a SMF 240. The method also includes an operation 1003 for forming a MMF 220 to have a first end and a second end and a length measured between the first and second ends of the MMF 220. The method also includes an operation 1005 for attaching the first end of the MMF 220 to the second end of the optical gap structure 230. The length of the optical gap structure 230 and the length of the MMF 220 are set to provide a prescribed working distance and a prescribed light beam waist diameter. In some embodiments, the prescribed working distance is a distance measured from the second end of the MMF 220 to a location of the prescribed light beam waist diameter.

FIG. 10 shows a flowchart of a method for manufacturing a chip assembly, in accordance with some embodiments of the present invention. The method includes an operation 1101 for connecting a plurality of lens assemblies 200 to a chip. Each lens assembly 200 includes a respective optical gap structure 230 and a respective MMF 220. Each optical gap structure 230 has a first end and a second end and a length measured between the first and second ends of the optical gap structure 230. The first end of a given optical gap structure 230 is attached to an end of a corresponding SMF 240. Each MMF 220 has a first end and a second end and a length measured between the first and second ends of the MMF 220. The first end of a given MMF 220 is attached to the second end of a corresponding optical gap structure 230. Within a given lens assembly 200, the length of the optical gap structure 230 and the length of the MMF 220 are set to provide a prescribed working distance and a prescribed light beam waist diameter. In some embodiments, the prescribed working distance is a distance measured from the second end of the MMF 220 within the given lens assembly 200 to a location of the prescribed light beam waist diameter.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in other embodiments, even if not specifically shown or described. Such variations of the example embodiments disclosed herein are not to be regarded as a departure from the invention, and all such modifications are intended to be included within the scope of the invention.

Although the foregoing invention has been described in some detail for purposes of clarity of understanding, it will be apparent that certain changes and modifications can be practiced within the scope of the invention description. Accordingly, the example embodiments disclosed herein are to be considered as illustrative and not restrictive, and the invention is not to be limited to the details given herein, but may be modified within the scope and equivalents of the described embodiments.

What is claimed is:

1. A lens assembly for an optical fiber, comprising:
    an optical gap structure having a first end and a second end and a length measured between the first and second ends of the optical gap structure, the first end of the optical gap structure configured to attach to an end of a single-mode optical fiber, wherein the optical gap structure is formed of a material that provides for propagation of a beam of light through the optical gap structure in approximately free diffraction; and
    a multi-mode optical fiber having a first end and a second end and a length measured between the first and second ends of the multi-mode optical fiber, the first end of the multi-mode optical fiber attached to the second end of the optical gap structure,
    wherein the length of the optical gap structure and the length of the multi-mode optical fiber are set to provide a prescribed working distance and a prescribed light beam waist diameter, wherein the prescribed working distance is a distance measured from the second end of the multi-mode optical fiber to a location of the prescribed light beam waist diameter, and
    wherein the length of the optical gap structure is set to ensure that a diameter of a beam of light traveling from the optical gap structure through the multi-mode optical fiber does not exceed seventy percent of a core diameter of the multi-mode optical fiber within the multi-mode optical fiber.

2. The lens assembly as recited in claim 1, wherein the length of the optical gap structure is within a range extending from about 150 micrometers to about 300 micrometers.

3. The lens assembly as recited in claim 1, wherein the length of the multi-mode optical fiber is within a range extending from about 150 micrometers to about 250 micrometers.

4. The lens assembly as recited in claim 1, wherein an outer diameter of the optical gap structure is substantially equal to an outer diameter of the single-mode optical fiber, and wherein a refractive index of the optical gap structure is substantially equal to a refractive index of the single-mode optical fiber.

5. The lens assembly as recited in claim 1, wherein the first end of the optical gap structure is spliced to the end of the single-mode optical fiber, and the second end of the optical gap structure is spliced to the first end of the multi-mode optical fiber.

6. The lens assembly as recited in claim 1, wherein the multi-mode optical fiber is formed of a material that causes focusing of a beam of light as the beam of light travels through the multi-mode optical fiber.

7. The lens assembly as recited in claim 6, wherein the material of the multi-mode optical fiber has a graded optical index.

8. The lens assembly as recited in claim 1, wherein one or more of the length of the multi-mode optical fiber, a material of the multi-mode optical fiber, and the length of the optical gap structure is defined to cause convergence of a beam of light at the second end of the multi-mode optical fiber.

9. The lens assembly as recited in claim 1, further comprising:
    a coreless optical fiber having a first end attached to the second end of the multi-mode optical fiber.

10. The lens assembly as recited in claim 9, wherein an outer diameter of the coreless optical fiber is substantially equal to an outer diameter of the multi-mode optical fiber.

11. The lens assembly as recited in claim 1, further comprising:
    an optical end structure having a first end spliced to the second end of the multi-mode optical fiber.

12. The lens assembly as recited in claim 1, further comprising:
    an optical end structure having a first end attached to the second end of the multi-mode optical fiber, wherein a second end of the optical end structure is configured to have a planar surface oriented substantially perpendicular to an axis of the lens assembly.

13. The lens assembly as recited in claim 1, further comprising:
    an optical end structure having a first end attached to the second end of the multi-mode optical fiber, wherein a second end of the optical end structure is configured to have a planar surface oriented non-perpendicular to an axis of the lens assembly.

14. The lens assembly as recited in claim 13, wherein the planar surface of the second end of the optical end structure is covered by a mirror material.

15. The lens assembly as recited in claim 14, wherein the mirror material includes one or more layers of dielectric material.

16. The lens assembly as recited in claim 13, wherein an angle measured between a line oriented normal to the planar surface of the second end of the optical end structure and an axis of the multi-mode optical fiber is substantially equal to one-half of an angular quantity given by ninety degrees minus a grating tilt angle of an optical grating into which a light beam is to be directed from the planar surface of the second end of the optical end structure.

17. The lens assembly as recited in claim 13, wherein an angle measured between a line oriented normal to the planar surface of the second end of the optical end structure and an axis of the multi-mode optical fiber is within a range extending from about 30 degrees to about 60 degrees.

18. The lens assembly as recited in claim 13, wherein the single-mode optical fiber is a polarization maintaining optical fiber, and wherein birefringent axes of the polarization maintaining optical fiber are aligned relative to a cleave angle of the planar surface of the second end of the optical end structure.

19. The lens assembly as recited in claim 1, wherein the lens assembly is connected to a chip in a configuration that provides for direction of a beam of light from the lens assembly into the chip.

20. The lens assembly as recited in claim 18, wherein an axis of the lens assembly is oriented parallel to an outer surface of the chip.

21. A method for manufacturing a lens assembly for an optical fiber, comprising:
forming an optical gap structure to have a first end and a second end and a length measured between the first and second ends of the optical gap structure, the first end of the optical gap structure configured to attach to an end of a single-mode optical fiber;
forming a multi-mode optical fiber to have a first end and a second end and a length measured between the first and second ends of the multi-mode optical fiber; and
attaching the first end of the multi-mode optical fiber to the second end of the optical gap structure,
wherein the length of the optical gap structure and the length of the multi-mode optical fiber are set to provide a prescribed working distance and a prescribed light beam waist diameter, wherein the prescribed working distance is a distance measured from the second end of the multi-mode optical fiber to a location of the prescribed light beam waist diameter, and
wherein the length of the optical gap structure is set to ensure that a diameter of a beam of light traveling from the optical gap structure through the multi-mode optical fiber does not exceed seventy percent of a core diameter of the multi-mode optical fiber within the multi-mode optical fiber.

22. The method as recited in claim 21, wherein the length of the optical gap structure is within a range extending from about 150 micrometers to about 300 micrometers.

23. The method as recited in claim 21, wherein the length of the multi-mode optical fiber is within a range extending from about 150 micrometers to about 250 micrometers modulo a period of the multi-mode optical fiber.

24. The method as recited in claim 21, wherein an outer diameter of the optical gap structure is substantially equal to an outer diameter of the single-mode optical fiber, and wherein a refractive index of the optical gap structure is substantially equal to a refractive index of the single-mode optical fiber.

25. The method as recited in claim 21, further comprising:
splicing the first end of the optical gap structure to the end of the single-mode optical fiber; and
splicing the second end of the optical gap structure to the first end of the multi-mode optical fiber.

26. The method as recited in claim 21, wherein the multi-mode optical fiber is formed of a material that causes focusing of a beam of light as the beam of light travels through the multi-mode optical fiber.

27. The method as recited in claim 21, wherein the material of the multi-mode optical fiber has a graded optical index.

28. The method as recited in claim 21, wherein one or more of the length of the multi-mode optical fiber, a material of the multi-mode optical fiber, and the length of the optical gap structure is defined to cause convergence of a beam of light at the second end of the multi-mode optical fiber.

29. The method as recited in claim 21, further comprising:
attaching a first end of a coreless optical fiber to the second end of the multi-mode optical fiber.

30. The method as recited in claim 29, wherein an outer diameter of the coreless optical fiber is substantially equal to an outer diameter of the multi-mode optical fiber.

31. The method as recited in claim 21, further comprising:
splicing a first end of an optical end structure to the second end of the multi-mode optical fiber.

32. The method as recited in claim 21, further comprising:
attached a first end of an optical end structure to the second end of the multi-mode optical fiber, with a second end of the optical end structure having a planar surface oriented substantially perpendicular to an axis of the lens assembly.

33. The method as recited in claim 21, further comprising:
attaching a first end of an optical end structure to the second end of the multi-mode optical fiber, with a second end of the optical end structure having a planar surface oriented non-perpendicular to an axis of the lens assembly.

34. The method as recited in claim 33, further comprising:
covering the planar surface of the second end of the optical end structure with a mirror material.

35. The method as recited in claim 34, wherein the mirror material includes one or more layers of dielectric material.

36. The method as recited in claim 33, further comprising:
forming the planar surface of the second end of the optical end structure so that an angle measured between a line oriented normal to the planar surface of the second end of the optical end structure and an axis of the multi-mode optical fiber is substantially equal to one-half of an angular quantity given by ninety degrees minus a grating tilt angle of an optical grating into which a light beam is to be directed from the planar surface of the second end of the optical end structure.

37. The method as recited in claim 33, further comprising:
forming the planar surface of the second end of the optical end structure so that an angle measured between a line oriented normal to the planar surface of the second end of the optical end structure and an axis of the multi-mode optical fiber is within a range extending from about 30 degrees to about 60 degrees.

38. The method as recited in claim 33, wherein the single-mode optical fiber is a polarization maintaining optical fiber, and wherein the method includes connecting the first end of the optical gap structure to the polarization maintaining optical fiber so that birefringent axes of the polarization maintaining optical fiber are aligned relative to a cleave angle of the planar surface of the second end of the optical end structure.

39. The method as recited in claim 21, further comprising:
connecting the lens assembly to a chip in a configuration that provides for direction of a beam of light from the lens assembly into the chip.

40. The method as recited in claim 39, wherein an axis of the lens assembly is oriented parallel to an outer surface of the chip.

\* \* \* \* \*